3,655,689
IMIDAZOLIDINEDIONE HERBICIDES
Malcolm Scott Singer, Richmond, Calif., assignor to Chevron Research Company, San Francisco, Calif.
No Drawing. Continuation-in-part of application Ser. No. 745,417, July 17, 1968. This application Aug. 22, 1969, Ser. No. 852,509
Int. Cl. C07d 49/32
U.S. Cl. 260—309.5      4 Claims

ABSTRACT OF THE DISCLOSURE

5 - imino-imidazolidinediones and 4-thio-5-imino-imidazolidinediones in which the nitrogen in the 1 position of the imidazolidinedione nucleus is substituted with an aryl radical of 6 to 15 carbon atoms, the nitrogen in the 3 position is substituted with an aliphatic or cycloaliphatic radical and the imino group is optionally substituted with a carbamoyl or N-chloroacetylcarbamoyl radical. These imidazolidinediones are pre- and post-emergence herbicides.

CROSS REFERENCE TO RELATED APPLICATIONS

This application is a continuation-in-part of application Ser. No. 745,417, filed July 17, 1968, now abandoned.

FIELD OF INVENTION

This invention relates to novel imidazolidinediones and their use as herbicides.

DESCRIPTION OF INVENTION

The novel imidazolidinediones of this invention may be represented by the formula

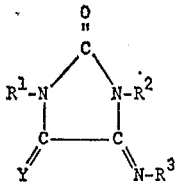

wherein Y is a chalcogen atom of atomic number 8 to 16, i.e., O or S, $R^1$ contains 1 to about 10 carbon atoms and is aliphatic or cycloaliphatic with the proviso that when Y is S, $R^1$ is alkyl or cycloalkyl of the above-mentioned carbon content, $R^2$ contains 6 to about 15 carbon atoms and is aryl nuclearly substituted with 0 to 1 trifluoromethyl and/or 0 to 2 halogens of atomic number 9 to 35, i.e., F, Cl and Br, nitro groups, alkyl of 1 to 4 carbon atoms each or alkoxy groups individually having 1 to 4 carbon atoms and $R^3$ is hydrogen, acetyl or carbamoyl in which the nitrogen is singly substituted with alkyl of 1 to 10 carbon atoms, chloroacetyl or $R^2$. $R^1$ may be substituted with 0 to 1 halogen of atomic number 17 to 35 or alkoxy of 1 to 4 carbon atoms. Of course, when $R^1$ represents a cycloaliphatic radical it contains a minimum of 3 carbon atoms. Preferably $R^1$ contains 1 to 6 carbon atoms and is an unsubstituted alkyl or unsubstituted cycloalkyl radical, $R^2$ is phenyl substituted with 0 to 1 trifluoromethyl and/or 0 to 2 halogens of atomic number 9 to 35, nitro groups, alkyl of 1 to 4 carbon atoms, or alkoxy of 1 to 4 carbon atoms and $R^3$ is hydrogen.

Examples of radicals which $R^1$ may represent are alkyl such as methyl, ethyl, isopropyl, butyl, hexyl, nonyl and decyl; cycloalkyl such as cyclopropyl, cyclobutyl, cyclohexyl and cyclooctyl; alkenyl such as allyl, pentenyl and hexenyl; cycloalkenyl such as cyclohexenyl; alkynyl such as propargyl; chloromethyl, bromoethyl, methoxyethyl, ethoxyethyl, chlorocyclohexyl, bromocyclohexyl and p-methoxycyclohexyl.

Typical radicals which $R^2$ may represent are phenyl, tolyl, xylyl, cumyl, naphthyl, benzyl, phenylethyl, phenylbutyl, o-butylphenyl, 3,5-dipropylphenyl, o-, m- and p-chlorophenyl, o-, m- and p-fluorophenyl, o-, m- and p-bromophenyl, 3,5-dibromophenyl, 2,6-difluorophenyl, 2-fluoro-4-bromophenyl, 3-chloro-5-fluorophenyl, 3-chloro-5-propoxyphenyl, 2-fluoro-4,5-dimethylphenyl, 3-chloro-5-butylphenyl, p-chlorobenzyl, 2,6 - dimethyl-4-trifluoromethylphenyl, 3-methyl - 5 - propoxyphenyl, 5-trifluoromethylnaphthyl, 5,8-dimethylnaphthyl, 2,4-dichlorophenyl, o-, m- and p-methoxyphenyl, o-, m- and p-nitrophenyl, p-butoxyphenyl 2,4-dinitrophenyl, 2-fluoro-5-nitrophenyl, p-ethoxyphenyl, 6-chloronaphthyl, 6-bromonaphthyl, 6-nitronaphthyl, 3,7-dichloronaphthyl, 2-methoxynaphthyl, 4-ethylnaphthyl, 2-nitro-4-trifluoromethylphenyl, o-, m- and p-trifluoromethylphenyl, 3-chloro-5-trifluoromethylphenyl, 2,6-difluoro-4-trifluoromethylphenyl, 2-bromo-5-trifluoromethylphenyl, 2 - chloro-4-trifluoromethylphenyl, 3-trifluoromethylphenyl - 5 - methoxyphenyl, 3-butoxy-5-trifluoromethylphenyl and 2,5-difluoro-4-trifluoromethylphenyl.

In the imidazolidinediones of this invention in which $R^3$ is carbamoyl in which the nitrogen is substituted with alkyl, the alkyl may be branched or straight-chained. Such alkyl groups include methyl, ethyl, propyl, isobutyl, hexyl, 5-methylheptyl, n-octyl and n-decyl. Alkyl of 1 to 6 carbon atoms is preferred.

Illustrative imidazolidinediones of this invention are 1-phenyl-3-methyl-4-thio-5-imino-2,4-imidazolidinedione,
1-p-bromophenyl-3-isopropyl-5-imino-2,4-imidazolidinedione,
1-(2',4'-dichlorophenyl)-3-chloromethyl-5-imino-2,4-imidazolidinedione,
1-xylyl-3-methoxypropyl-4-thio-5-imino-2,4-imidazolidinedione,
1-o-bromo-phenyl-3-cyclohexyl-5-imino-2,4-imidazolidinedione,
1-p-nitrophenyl-3-cyclobutyl-5-imino-2,4-imidazolidinedione,
1-o-fluorophenyl-3-(4'-bromocyclohexyl)-4-thio-5-imino-2,4-imidazoladinedione,
1-naphthyl-3-hexyl-5-imino-2,4-imidazolidinedione,
1-(6'-chloronaphthyl)-3-allyl-5-imino-2,4-imidazolidinedione,
1-(6'-nitronaphthyl)-3-hexenyl-5-imino-2,4-imidazolidinedione,
1-(3',5'-dinitrophenyl)-3-butoxyethyl-4-thio-5-imino-2,4-imidazolidinedione,
1-p-methoxyphenyl-3-cyclobutyl-4-thio-5-imino-2,4-imidazolidinedione,
1-o-ethoxyphenyl-3-bromoethyl-5-imino-2,4-imidazolidinedione,
1-m-butoxyphenyl-3-methyl-4-thio-5-imino-2,4-imidazolidinedione,
1-(3',4'-dibromophenyl)-3-decyl-4-thio-5-imino-2,4-imidazolidinedione,
1-p-fluorophenyl-3-propargyl-5-imino-2,4-imidazolidinedione,
1-(6'-methoxynaphthyl)-3-methyl-5-imino-2,4-imidazolidinedione,
1-phenyl-3-(4'-chlorocyclohexyl)-4-thio-5-imino-2,4-imidazolidinedione,
1-phenyl-3-methyl-4-thio-5-N-methylcarbamoylimino-2,4-imidazolidinedione,
1-(2',4'-dichlorophenyl)-3-hexyl-5-N-butylcarbamoylimino-2,4-imidazolidinedione,
1-p-nitrophenyl-3-allyl-5-N-octylcarbamoylimino-2,4-imidazolidinedione,
1-p-methoxyphenyl-3-cyclohexyl-5-N-ethylcarbamoylimino-2,4-imidazolidinedione, 1-(6-chloronaphthyl)-3-methyl-4-thio-5-N-decylcarbamoylimino-2,4-imidazolidinedione,
1-phenyl-3-cyclohexenyl-5-N-phenylcarbamoylimino-2,4-imidazolidinedione,
1-p-fluorobenzyl-3-isopropyl-5-imino-2,4-imidazolidinedione,
1-(3'-methoxy-5'-trifluoromethylphenyl)-3-butyl-5-imino-2,4-imidazolidinedione,
1-(6'-fluoronaphthyl)-3-ethyl-4-thio-5-imino-2,4-imidazolidinedione,
1-(2'-fluoro-4'-n-propylphenyl)-3-allyl-5-imino-2,4-imidazolidinedione,
1-(3'-nitro-5'-trifluoromethylphenyl)-3-(2''-butenyl)-5-imino-2,4-imidazolidinedione,
1-(2',6'-difluoro-4'-trifluoromethylphenyl)-3-methyl-5-imino-2,4-imidazolidinedione,
1-(2'-fluoro-4'-chlorophenyl)-3-hexyl-5-imino-2,4-imidazolidinedione,
1-p-fluoro-3-cyclohexyl-5-imino-2,4-imidazolidinedione,
1-p-trifluoromethylphenyl-3-cyclobutyl-5-imino-2,4-imidazolidinedione,
1-(3'-nitro-5'-fluorobenzyl)-3-cyclopropyl-5-imino-2,4-imidazolidinedione,
1-phenyl-3-octyl-4-thio-5-N-hexylcarbamoylimino-2,4-imidazolidinedione,
1-p-fluorophenyl-3-cyclohexyl-5-N-methylcarbamoylimino-2,4-imidazolidinedione,
1-(2',4'-dichlorophenyl)-3-ethyl-4-thio-5-N-acetylimino-2,4-imidazolidinedione,
1-(3',5'-dinitrophenyl)-3-decyl-4-thio-5-N-acetylimino-2,4-imidazolidinedione,
1-(2',4'-dimethoxyphenyl)-3-methyl-4-thio-5-N-acetylimino-2,4-imidazolidinedione,
1-(2'-methoxy-5'-nitrophenyl)-3-cyclohexyl-5-N-acetylimino-2,4-imidazolidinedione,
1-p-ethylphenyl-3-methyl-4-thio-5-N-ethylcarbamoylimino-2,4-imidazolidinedione,
1-m-butylphenyl-3-ethyl-4-thio-5-N-p-chlorophenylcarbamoylimino-2,4-imidazolidine,
1-phenyl-3-methyl-4-thio-5-N-m-fluorophenylcarbamoylimino-2,4-imidazolidinedione,
1-m-trifluoromethylphenyl-3-heptyl-5-N-p-nitrophenylcarbamoylimino-2,4-imidazolidinedione,
1-p-tolyl-3-butyl-5-N-(3',5'-diethoxyphenyl)carbamoylimino-2,4-imidazolidinedione,
1-m-propylphenyl-3-p-chlorocyclohexyl-4-thio-5-N-p-trifluoromethylphenylcarbamoylimino-2,4-imidazolidinedione,
1-(2'-methyl-4'-ethylphenyl)-3-methyl-4-thio-5-N-p-tolylcarbamoylimino-2,4-imidazolidinedione, and
1-p-bromophenyl-3-ethyl-5-N-(3',5'-dibromophenyl)carbamoylimino-2,4-imidazolidinedione.

The imidazolidinediones of the above formula in which $R^3$ is hydrogen may be prepared by reacting a 1-cyanoformamide or 1-cyanothioformamide with an isocyanate in the presence of a base catalyst according to the following equation:

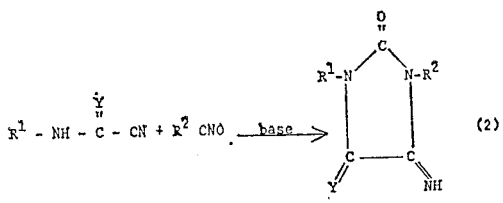

wherein $R^1$, $R^2$ and Y are as defined previously.

The compounds wherein $R^3$ is N-alkylcarbamoyl or N-chloroacetylcarbamoyl may be prepared by reacting the compounds wherein $R^3$ is H with an isocyanate in which the radical bound to the nitrogen, respectively, is the desired alkyl radical or

Excess $R^2CNO$, low temperatures and higher catalyst concentrations favor making compounds of the formula (3) 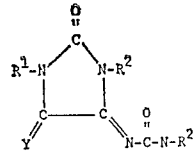

In such instances the reaction product may be a mixture of (2) and (3) above. The formation of (3) is particularly favored where $R^1$ is an unsaturated aliphatic radical.

Preferred base catalysts which may be used are tertiary amines such as triethyl amine and tributyl amine. These catalysts will be used in catalytic amounts, usually about 0.001 to 0.1 mol per mol of reactant. This reaction is exothermic and the temperature will usually be controlled within the range of 0 to 50° C. While in most instances the reactants are miscible, it is desirable to carry out the reaction in polar, aprotic solvents such as dimethoxyethane, tetrahydrofuran, acetonitrile, dimethylformamide and dimethyl sulfoxide.

These compounds and their preparation are further illustrated by the following examples. These examples are intended to illustrate the invention described herein and are in no manner intended to limit it. Unless otherwise indicated, percentages are by weight.

EXAMPLES

Example 1

4.9 g. of N-ethyl-1-cyanoformamide were mixed with 6.7 g. p-tolylisocyanate and 5 ml. dimethoxyethane in a vessel at ambient temperature. Two drops of triethylamine were added to this solution. The temperature of the reaction mixture rose but the temperature was kept below about 50° C. After exothermicity subsided about 20 ml. of ethanol were added and the mixture was scratched and cooled, causing some crystallization. 10 ml. benzene and about 50 ml. petroleum ether were then added to form a precipitate. The reaction mixture was then filtered and the solids dried, leaving 6 g. of 1-p-tolyl-3-etthyl-5-imino - 2,4 - imidazolidinedione. This compound was observed as a crystalline solid melting at 107–111° C. Its nitrogen analysis was: Theoretical 18.20%; found 18.00%.

Example 2

N-methyl-1-cyanothioformamide was prepared by mixing a benzene solution of methylisothiocyanate with aqueous potassium cyanide, allowing the mixture to stand at ambient temperature, extracting the aqueous layer with chloroform in the presence of H+ and removing the chloroform from the extract.

6.5 g. of 1-(3,4-dichlorophenyl)-3-methyl-4-thio-5-imino-2,4-imidazolidinedione was made by reacting 3.0 g. of N-methyl-1-cyanothioformamide with 5.0 g. of 3,4-dichlorophenylisocyanate by the general procedure of Example 1. This compound was observed as a crystalline solid melting at 185–188° C. Its Cl and S analyses were:
Theoretical (percent): Cl, 24.63; S, 11.11. Found (percent): Cl, 24.93; S, 11.25.

Example 3

6.3 g. of N-allyl-1-cyanothioformamide, 6.0 g. of phenylisocyanate and 3.5 g. of dimethoxyethane were mixed in a vessel of ambient temperature. 2 drops of triethylamine were added to the solution causing an extremely exothermic reaction. After 10 minutes the dimethoxyethane was removed leaving a red solid. This red solid was washed with ethanol and filtered. The solids were then recrystallized from a dimethoxyethaneethanol mixture to give 2–3 g. of 1-phenyl-3-allyl-4-thio-5-N-phenylcarbamoylimino-2,4-imidazolidinedione. This compound was observed as a crystalline solid melting at 215–217° C. Its N and S analyses were:

Theoretical (percent): N, 15.38; S, 8.78. Found (percent): N, 15.30; S, 8.97.

Example 4

10.15 g. of 1-phenyl-3-methyl-5-imino-2,4-imidazolidinedione and 25 g. of dimethoxyethane were charged to a vessel. 6.0 g. of chloroacetylisocyanate was added to this mixture. The 1-phenyl-3-methyl-5-imino-2,4-imidazolidinedione dissolved as the mixture became warm. 2 drops of triethylamine were added after 20 minutes. Crystallization occurred slowly after cooling. The precipitate was filtered and washed with dimethoxyethane. 12.5 g. of 1-phenyl-3-methyl-5-chloroacetylcarbamoylimino-2,4-imidazolidinedione was thus collected. This material melted at 198–202° C. Its N and Cl analyses were:

Theoretical (percent): N, 17.34; Cl, 11.00. Found (percent): N, 16.80; Cl, 10.60.

Example 5

11 g. of 1-phenyl-3-methyl-4-thio-5-imino-2,4-imidazolidinedione and 50 ml. dimethoxyethane were charged to a vessel. Ketene was added to the mixture for 20 minutes at a rate of 0.1 mol/hr. Two drops of $H_2SO_4$ were then added and ketene was bubbled through the mixture at the above rate for another hour. A solid precipitate formed which was filtered from the mixture. 7.1 g. of solid product was thus obtained. Infrared analysis of this solid and melting point comparisons indicated it was 1-phenyl-3-methyl-4-thio-5-acetylimino-2,4-imidazolidinedione. It melted at 197–200° C. Its N and S analyses were:

Theoretical (percent): N, 16.05; S, 12.25. Found (percent): N, 15.62; S, 12.00.

1-phenyl-3-methyl-5-acetylimino-2,4-imidazolidinedione was similarly prepared by treating 1-phenyl-3-methyl-5-imino-2,4-imidazolidinedione with ketene.

By the general procedure described in Examples 1, 3 and 4 other imidazolidinediones of this invention were prepared. These compounds and their analyses are reported in Table I.

TABLE I

| Compound | °C., melting point | Calculated N | Calculated Cl | Found N | Found Cl |
|---|---|---|---|---|---|
| 1-p-chlorophenyl-3-n-butyl-5-imino-2,4-imidazolidinedione | 70–72 | 15.03 | 14.12 | 12.70 | 12.45 |
| 1-phenyl-3-cyclohexyl-5-imino-2,4-imidazolidinedione | 78–79 | 15.5 | 15.10 | | |
| 1-p-nitrophenyl-3-methyl-5-imino-2,4-imidazolidinedione | 183–185 | 22.56 | 21.20 | | |
| 1-p-methoxyphenyl-3-methyl-5-imino-2,4-imidazolidinedione | 158–159 | 18.0 | 17.42 | | |
| 1-p-nitrophenyl-3-ethyl-5-imino-2,4-imidazolidinedione | 140–143 | 21.38 | 21.50 | | |
| 1-(3',4'-dichlorophenyl)-3-methyl-5-imino-2,4-imidazolidinedione | 150–145 | 15.45 | 15.20 | 26.10 | 25.50 |
| 1-m-tolyl-3-methyl-5-imino-2,4-imidazolidinedione | 130–137 | 19.38 | 10.16 | | |
| 1-p-tolyl-3-methyl-5-imino-2,4-imidazolidinedione | 164–167 | 19.38 | 19.75 | | |
| 1-phenyl-3-cyclohexyl-5-imino-2,4-imidazolidinedione | 78–79 | 15.5 | 15.10 | | |
| 1-m-chlorophenyl-3-methyl-5-imino-2,4-imidazolidinedione | 134–137 | 17.70 | 16.54 | 14.97 | 17.52 |
| 1-phenyl-3-methyl-5-imino-2,4-imidazolidinedione | 150–153 | 20.7 | 21.12 | | |
| 1-(3,4-dichlorophenyl)-3-ethyl-5-imino-2,4-imidazolidinedione | 94–97 | 14.69 | 14.95 | 24.81 | 24.69 |
| 1-p-chlorophenyl-3-allyl-5-imino-2,4-imidazolidinedione | 97–100 | 15.95 | 15.35 | 13.45 | 13.28 |
| 1-p-chlorophenyl-3-n-butyl-5-imino-2,4-imidazolidinedione | 70–72 | 15.03 | 14.12 | 12.70 | 12.45 |

TABLE—Continued

| Compound | °C., melting point | Calculated N | Calculated Cl | Found N | Found Cl |
|---|---|---|---|---|---|
| 1-o-fluorophenyl-3-methyl-4-thio-5-o-fluorophenylcarbamoyl-2,4-imidazolidinedione | 198–200 | 14.95 | 14.80 | | |
| 1-p-methoxyphenyl-3-ethyl-5-imino-2,4-imidazolidinedione | 95–98 | 17.01 | 16.90 | | |
| 1-p-chlorophenyl-3-ethyl-5-imino-2,4-imidazolidinedione | 111–115 | 16.70 | 16.40 | 14.12 | 13.85 |
| 1-m-chlorophenyl-3-methyl-4-thio-5-imino-2,4-imidazolidinedione | 147–149 | [1]12.62 | [1]12.52 | 14.00 | 14.68 |
| 1-m-chlorophenyl-3-ethyl-5-imino-2,4-imidazolidinedione | 62–66 | 16.70 | 16.40 | 14.12 | 13.62 |
| 1-p-fluorophenyl-3-methyl-5-imino-2,4-imidazolidinedione | 145–148 | 18.97 | 18.55 | | |
| 1-m-chlorophenyl-3-allyl-5-imino-2,4-imidazolidinedione | 81–83 | 15.92 | 15.18 | 13.45 | 12.48 |
| 1-phenyl-3-n-butyl-5-imino-2,4-imidazolidinedione | | 17.12 | 16.79 | | |
| 1-phenyl-3-allyl-5-imino-2,4-imidazolidinedione | 97–99 | 19.1 | 18.65 | | |
| 1-p-tolyl-3-allyl-5-imino-2,4-imidazolidinedione | 120–121 | 17.25 | 17.15 | | |
| 1-(m-trifluoromethylphenyl)-3-methyl-4-thio-5-imino-2,4-imidazolidinedione | 71–75 | 14.62 | 13.16 | | |
| 1-(4'-fluoro-3'-trifluoromethylphenyl)-3-methyl-5-imino-2,4-imidazolidinedione | 220–222 | | | [2]26.3 | 27.65 |
| 1-(4'-chloro-3'-trifluoromethylphenyl)-3-methyl-5-imino-2,4-imidazolidinedione | 102–103 | | | 11.62 | 11.23 |
| 1-(2'-fluoro-5'-trifluoromethylphenyl)-3-methyl-5-imino-2,4-imidazolidinedione | 133–138 | | | [2]26.25 | 26.25 |
| 1-(o-trifluoromethylphenyl)-3-methyl-4-thio-5-imino-2,4-imidazolidinedione | 144–145 | | | [2]19.85 | 22.20 |
| 1-(4'-fluoro-2'-trifluoromethylphenyl)-3-methyl-4-thio-5-imino-2,4-imidazolidinedione | 142–146 | [1]11.48 | 11.96 | | |
| 1-(4'-fluoro-3'-methylphenyl)-3-methyl-4-thio-5-imino-2,4-imidazolidinedione | 154–157 | [1]12.74 | 13.00 | | |
| 1-(5'-fluoro-2'-methylphenyl)-3-methyl-4-thio-5-imino-2,4-imidazolidinedione | 149–151 | [1]12.74 | 12.44 | [2]7.58 | 7.52 |
| 1-(3'-fluoro-4'-methylphenyl)-3-methyl-4-thio-5-imino-2,4-imidazolidinedione | 118–121 | [1]12.74 | 12.82 | | |
| 1-phenyl-3-methyl-4-thio-5-imino-2,4-imidazolidinedione | 127–129 | 19.18 | 19.12 | | |
| 1-p-chlorophenyl-3-methyl-4-thio-5-imino-2,4-imidazolidinedione | 116–125 | [1]12.62 | 11.79 | 14.02 | 14.22 |
| 1-p-fluorophenyl-3-methyl-4-thio-5-imino-2,4-imidazolidinedione | 155–156 | 17.71 | 17.85 | | |
| 1-o-chlorophenyl-3-methyl-4-thio-5-imino-2,4-imidazolidinedione | 141–143.5 | [1]12.62 | 12.22 | 14.01 | 14.21 |
| 1-o-fluorophenyl-3-methyl-4-thio-5-imino-2,4-imidazolidinedione | 142–146 | [1]13.49 | 13.12 | | |
| 1-o-fluorophenyl-3-methyl-5-imino-2,4-imidazolidinedione | 130–131 | 19.00 | 19.12 | | |
| 1-m-nitrophenyl-3-methyl-5-imino-2,4-imidazolidinedione | 165–171 | 22.58 | 21.20 | | |
| 1-m-bromophenyl-3-methyl-5-imino-2,4-imidazolidinedione | 107–113 | 14.87 | 13.82 | | |
| 1-(5'-fluoro-2'-methylphenyl)-3-methyl-5-imino-2,4-imidazolidinedione | 133–135 | 17.87 | 17.78 | | |
| 1-(4'-fluoro-2'-methylphenyl)-3-methyl-5-imino-2,4-imidazolidinedione | 133–140 | 17.87 | 16.92 | | |
| 1-(3'-fluoro-4'-methylphenyl)-3-methyl-5-imino-2,4-imidazolidinedione | 107–115 | 17.87 | 17.39 | | |
| 1-(4'-fluoro-3'-methylphenyl)-3-methyl-5-imino-2,4-imidazolidinedione | 113–118 | 17.87 | 17.27 | | |
| 1-m-bromophenyl-3-methyl-4-thio-5-imino-2,4-imidazolidinedione | 147–149 | [1]10.73 | [3]2.6.8 | 10.92 | 25.4 |
| 1-(2',4'-difluorophenyl)-3-methyl-5-imino-2,4-imidazolidinedione | 156–158 | | [2]15.25 | | 15.78 |
| 1-phenyl-3-methyl-4-thio-5-phenylcarbamoylimino-2,4-imidazolidinedione | 221–222 | [1]9.47 | | 10.87 | |

See footnotes at end of table.

TABLE I.—Continued

| Compound | °C., melting point | Element analyses | | | |
|---|---|---|---|---|---|
| | | Calculated | | Found | |
| | | N | Cl | N | Cl |
| 1-o-fluorophenyl-3-methyl-4-thio-5-chloroacetyl carbamoylimino-2,4-imidazolidinedione | 160-165 | [1] 8.99 | 9.94 | 8.67 | 9.95 |
| 1-phenyl-3-methyl-4-thio-5-chloroacetylcarbomoyl-imino-2,4-imidazolidine-dione | 150-157 | [1] 9.46 | 10.47 | 8.55 | 40.48 |
| 1-(2'-fluoro-5-trifluoromethylphenyl)-3-methyl-4-thio-5-imino-2,4-imidazolidine-dione | 86-86 | [1] 11.48 | | 11.92 | |
| 1-(4'-chloro-3'-trifluoromethylphenyl)-3-methyl-4-thio-5-imino-2,4-imidazolidinedione | 121-125 | [1] 9.96 | 11.03 | 10.17 | 10.70 |
| 1-(4'-fluoro-3'-trifluoromethylphenyl)-3-methyl-4-thio-5-imino-2,4-imidazolidinedione | 147-151 | [1] 11.48 | | 11.62 | |

[1] Sulfur.  [2] Fluorine.  [3] Bromine.

UTILITY

Imidazolidinediones of this invention are herbicidal in pre- and post-emergence applications. For pre-emergence control of undesirable vegetation these imidazolidinediones will be applied in herbicidal quantities to the environment, e.g., soil infested with seeds and/or seedlings of such vegetation. Such application will inhibit the growth of or kill the seeds, germinating seeds and seelings. They are applied directly to the foilage and other plant parts in post-emergence applications. They are effective against weed grasses as well as broadleaved weeds.

The uniqueness of the imidazolidinediones of this invention is evidenced by the fact that known corresponding compounds wherein the substituents $R^1$ and $R^2$ in the above formulas are of the same subgenus, e.g., both aryl or both aliphatic, exhibit little, if any, herbicidal activity.

Pre-emergence herbicidal tests on representative imidazolidinediones of this invention were made using the following method.

An acetone solution of the test imidazolidinedione was prepared by mixing 750 mg. imidazolidinedione, 220 mg. surfactant and 5 ml. acetone. This solution was added to c.a. 125 ml. water containing 156 mg. surfactant.

Seeds of the test vegetation were planted in a pot of soil and the imidazolidinedione solution was sprayed uniformly onto the soil surface at a dose of 100 micrograms per cm.[2]. The pot was watered and placed in a greenhouse. The pot was watered intermittently and observed for seedling emergence, health of emerging seedlings, etc., for a 3-week period. At the end of this peirod the herbicidal effectiveness of the imidazolidinedione was rated based on the physiological observations. A 0 to 100 scale was used; 0 representing no phytotoxicity, 100 representing complete kill. These test results appear in Table II.

For comparison several known compounds in which $R^1$ and $R^2$ in the above formulas are radicals of the same subgenus were also tested. The test results on these comparison compounds also appear in Table II.

TABLE II

| Compound | Herbicidal effectiveness | | | |
|---|---|---|---|---|
| | W | M | P | L |
| 1-p-tolyl-3-ethyl-5-imino-2,4-imidazolidinedione | | 100 | 100 | 100 |
| 1-(3,4-dichlorophenyl)-3-methyl-4-thio-5-imino-2,4-imidazolidinedione | 100 | 100 | 100 | 100 |
| 1-phenyl-3-cyclohexyl-5-imino-2,4-imidazolidinedione | 99 | 99 | 99 | 99 |
| 1-p-methoxyphenyl-3-methyl-5-imino-2,4-imidaxolidinedione | 100 | 100 | 100 | 100 |
| 1-m-chlorophenyl-3-methyl-5-imino-2,4-imidazolidinedione | 100 | 100 | 100 | 100 |
| 1-phenyl-3-methyl-5-imino-2,4-imidazolidinedione | 100 | 100 | 100 | 100 |
| 1-(3,4-dichlorophenyl)-3-methyl-5-imino-2,4-imidazolidinedione | 100 | 100 | 100 | 100 |
| 1-m-tolyl-3-methyl-5-imino-2,4-imidazolidinedione | 100 | 100 | 100 | 100 |
| 1-m-chlorophenyl-3-methyl-5-imino-2,4-imidazolidinedione | 100 | 100 | 100 | 100 |
| 1-(3,4-dichlorophenyl)-3-ethyl-5-imino-2,4-imidazolidinedione | | 100 | 100 | 100 |
| 1-p-chlorophenyl-3-allyl-5-imino-2,4-imidazolidinedione | | 100 | 100 | 100 |
| 1-(m-trifluoromethylphenyl)-3-methyl-4-thio-5-imino-2,4-imidazolidinedione | 100 | 100 | 100 | 100 |
| 1-(4'-fluoro-3'-trifluoromethylphenyl)-3-methyl-5-imino-2,4-imidazolidinedione | 100 | 100 | 100 | 100 |
| 1-(4'-chloro-3'trifluoromethylphenyl)-3-methyl-imino-2,4-imidazolidinedione | 100 | 100 | 100 | 100 |
| 1-(o-trifluoromethylphenyl)-3-methyl-4-thio-5-imino-2,4-imidazolidinedione | 80 | 60 | 50 | 60 |
| 1-(5'-fluoro-2'-methylphenyl)-3-methyl-4-thio-5-imino-2,4-imidazolidinedione | 100 | 100 | 100 | 100 |
| 1-(3'-fluoro-4'methylphenyl)-3-methyl-4-thio-5-imino-2,4-imidazolidinedione | 100 | 100 | 100 | 100 |
| 1-phenyl-3-methyl-4-thio-5-imino-2,4-imidazolidinedione | 100 | 100 | 100 | 100 |
| 1-p-chlorophenyl-3-methyl-4-thio-5-imino-2,4-imidazolidinedione | 100 | 100 | 100 | 100 |
| 1-p-fluorophenyl-3-methyl-4-thio-5-imino-2,4-imidazolidinedione | 100 | 100 | 100 | 100 |
| 1-(2'-fluoro-5'-trifluoromethylphenyl)-3-methyl-5-imino-2,4-imidazolidinedione | 100 | 100 | 100 | 100 |
| 1-o-chlorophenyl-3-methyl-4-thio-5-imino-2,4-imidazolidinedione | 96 | 99 | 99 | 90 |
| 1-o-fluorophenyl-3-methyl-4-thio-5-imino-2,4-imidazolidinedione | 100 | 100 | 100 | 100 |
| 1-o-fluorophenyl-3-methyl-5-imino-2,4-imidazolidinedione | 100 | 100 | 100 | 100 |
| 1-m-nitrophenyl-3-methyl-5-imino-2,4-imidazolidinedione | 100 | 100 | 80 | 85 |
| 1-m-bromophenyl-3-methyl-5-imino-2,4-imidazolidinedione | 100 | 100 | 100 | 100 |
| 1-(5'-fluoro-2'-methylphenyl)-3-methyl-5-imino-2,4-imidazolidinedione | 99 | 100 | 100 | 100 |
| 1-(3'-fluoro-4'-methylphenyl)-3-methyl-5-imino-2,4-imidazolidinedione | 100 | 100 | 100 | 100 |
| 1-(4'-fluoro-3'-methylphenyl)-3-methyl-5-imino-2,4-imidazolidinedione | 100 | 100 | 100 | 100 |
| 1-m-bromophenyl-3-methyl-4-thio-5-imino-2,4-imidazolidinedione | 100 | 100 | 100 | 100 |
| 1-(2',4'-difluorophenyl)-3-methyl-5-imino-2,4-imidazolidinedione | 100 | 100 | 100 | 100 |
| 1-phenyl-3-methyl-4-thio-5-phenylcarbamoyl-imino-2,4-imidazolidinedione | 100 | 99 | 99 | 99 |
| 1-phenyl-3-methyl-5-chloroacetylcarbamoyl-imino-2,4-imidazolidinedione | 100 | 100 | 100 | 100 |
| 1-o-fluorophenyl-3-methyl-4-thio-5-chloro-acetylcarbamoylimino-2,4-imidazolidinedione | 100 | 100 | 100 | 100 |
| 1-phenyl-3-methyl-4-thio-5-chloroacetyl-carbamoylimino-2,4-imidazolidinedione | 100 | 100 | 100 | 100 |
| 1-(2'-fluoro-5-trifluoromethylphenyl)-3-methyl-4-thio-5-imino-2,4-imidazolidinedione | 100 | 100 | 100 | 100 |
| 1-(4'-chloro-3'-trifluoromethylphenyl)-3-methyl-4-thio-5-imino-2,4-imidazolidinedione | 70 | 100 | 100 | 100 |
| 1-(4'-fluoro-3'-trifluoromethylphenyl)-3-methyl-4-thio-5-imino-2,4-imidazolidinedione | 90 | 100 | 100 | 100 |
| 1-p-chlorophenyl-3-ethyl-5-imino-2,4-imidazolidinedione | 100 | 100 | 100 | 100 |
| 1-m-chlorophenyl-3-methyl-5-imino-2,4-imidazolidinedione | 100 | 100 | 100 | 100 |
| 1-m-chlorophenyl-3-ethyl-5-imino-2,4-imidazolidinedione | 100 | 100 | | 100 |
| 1-p-fluorophenyl-3-methyl-5-imino-2,4-imidazolidinedione | 100 | 100 | 100 | 100 |
| 1-m-chlorophenyl-3-allyl-5-imino-2,4-imidazolidinedione | 100 | 100 | | 100 |
| 1-phenyl-3-n-butyl-5-imino-2,4-imidazolidinedione | 100 | 100 | | 100 |
| 1-phenyl-3-allyl-5-imino-2,4-imidazolidinedione | 100 | 100 | 100 | 100 |
| | Comparison | | | |
| 1,3-dimethyl-5-imino-2,4-imidazolidinedione | 0 | 0 | 0 | 0 |
| 1-m-chlorophenyl-3-phenyl-4-thio-5-imino-2,4-imidazolidinedione | 4 | 0 | 0 | 0 |
| 1,3-di(4-nitrophenyl)-5-imino-2,4-imidazolidinedione | 0 | 22 | 10 | 10 |
| 1-p-methoxyphenyl-3-phenyl-4-thio-5-imino-2,4-imidazolidinedione | 0 | 0 | 0 | 0 |

NOTE.—W=Watergrass (*Echinochloa crusgalli*); M=Mustard (*Brassica arvensis*); P=Pigweed (*Amaranthus retroflexus*); L=Lambsquarter *Chenopodium album*).

The data of Table II illustrate the specificity of the substituents on the nuclear nitrogens of the imidazolidinediones of this invention. It is truly unexpected and surprising that these substituents must be from different genera in order for the compounds to exhibit any significant herbicidal effectiveness.

The amount of imidazolidinedione administered will vary with the particular plant part or plant growth medium which is to be contacted, the general location of application, i.e., sheltered areas such as greenhouses as compared to exposed areas such as fields, as well as the desired type of control. For preemergent control of most plants dosages in the range of about 0.5 to 20 lbs. per acre will be used. Such administration will give a concentration of about 2 to 80 p.p.m. imidazolidinedione distributed throughout 0.1 acre-foot. For post-emergence application, such as foliar spray application, compositions containing about 0.5 to 8 lbs. imidazolidinedione per 100 gal. spray will be used. Such application is equivalent to about 0.5 to 20 lbs. imidazolidinedione per acre.

The herbicidal compositions of this invention comprise a herbicidal amount of one or more of the above described imidazolidinediones intimately admixed with a biologically inert carrier. The carrier may be a liquid diluent such as water or acetone or a solid. The carrier may be a liquid diluent such as water or acetone or a solid. The solid may be in the form of dust, powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, filler and the like.

I claim:

1. Compound of the formula

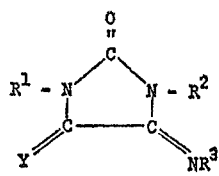

wherein Y is is a chalcogen atom of atomic number 8 to 16, $R^1$ is alkyl of 1 to 10 carbon atoms, cycloalkyl of 3 to 8 carbon atoms, alkenyl of 3 to 6 carbon atoms, cyclohexenyl or propargyl, the same being substituted with 0 to 1 halogen of atomic number 9 to 35 or alkoxy of 1 to 4 carbon atoms, with the proviso that when Y is S, $R^1$ is alkyl or cycloalkyl, $R^2$ contains a total of 6 to 15 carbon atoms and is phenyl substituted with 0 to 1 trifluoromethyl and/or 0 to 2 halogens of atomic number 9 to 35, nitro groups, alkyl groups of 1 to 4 carbon atoms or alkoxy groups individually having 1 to 4 carbon atoms and $R^3$ is hydrogen, acetyl or carbamoyl in which the nitrogen is singly substituted with alkyl of 1 to 10 carbon atoms, $R^2$ or chloroacetyl.

2. The compound of claim 1 wherein $R^1$ is an unsubstituted alkyl of 1 to 6 carbon atoms or unsubstituted cycloalkyl radical of 3 to 6 carbon atoms, $R^2$ is phenyl substituted with 0 to 1 trifluoromethyl and/or 0 to 2 halogens of atomic number of 9 to 35, nitro, alkoxy of 1 to 4 carbon atoms or alkyl of 1 to 4 carbon atoms and $R^3$ is hydrogen.

3. The compound of claim 1 wherein Y is oxygen, $R^1$ is methyl, ethyl, butyl, allyl, or cyclohexyl, $R^2$ is phenyl, tolyl, chlorophenyl, fluorophenyl, nitrophenyl, methoxyphenyl or dichlorophenyl and $R^3$ is hydrogen.

4. The compound of claim 1 wherein $R^3$ is carbamoyl in which the nitrogen is singly substituted with alkyl of 1 to 6 carbon atoms.

References Cited

UNITED STATES PATENTS 3,287,466   11/1966   Klopping _____ 260—306.7
3,287,467   11/1966   Gerjovich _____ 260—306.7

OTHER REFERENCES

Oku et al.: Makromol. Chem. 78, 186–93 (1964).
Patton: J. Org. Chem. 32 (2), 383–8 (1967).

HENRY R. JILES, Primary Examiner
G. T. TODD, Assistant Examiner

U.S. Cl. X.R.
71—92